Nov. 11, 1969   F. M. GAY   3,477,880
THERMO-COUPLE DEVICE FOR CURRENT MEASUREMENT
Filed Feb. 14, 1966
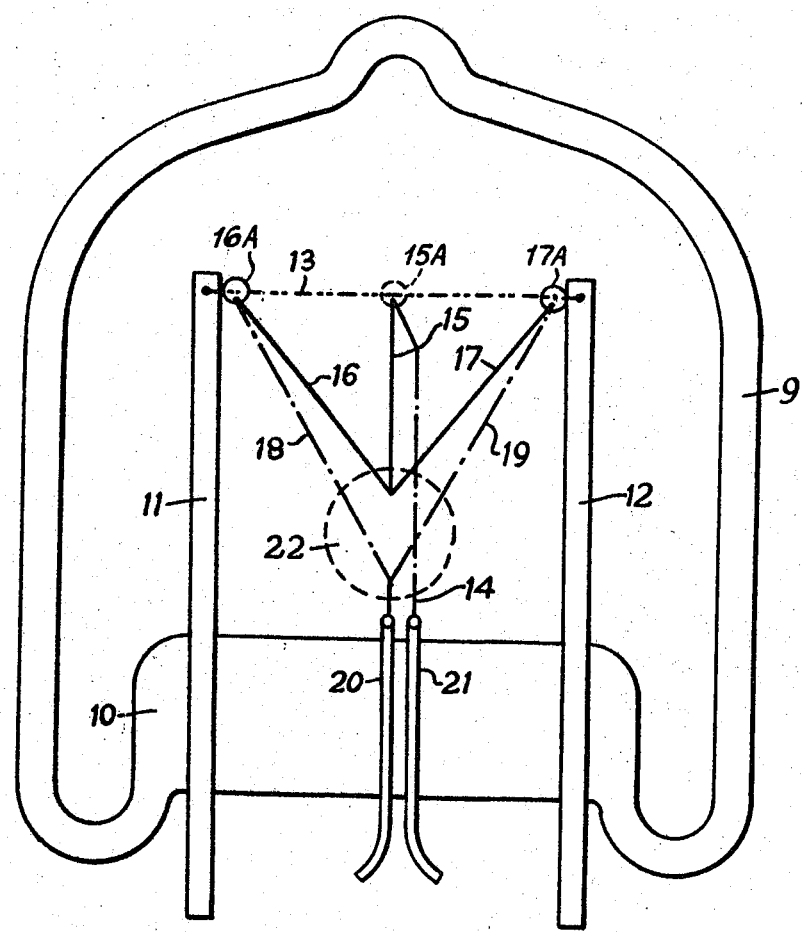
INVENTOR
Frank Munro Gay
BY Kemon Palmer
Stewart v Estabrook
ATTORNEYS

United States Patent Office 3,477,880
Patented Nov. 11, 1969

3,477,880
THERMO-COUPLE DEVICE FOR CURRENT MEASUREMENT
Frank Munro Gay, Felixstone, England, assignor to A. C. Cossor Limited, Harlow, Essex, England
Filed Feb. 14, 1966, Ser. No. 527,132
Claims priority, application Great Britain, Feb. 26, 1965, 8,473/65
Int. Cl. H01v 1/30
U.S. Cl. 136—207
5 Claims

ABSTRACT OF THE DISCLOSURE

In a thermal ammeter a main thermo-couple is attached to the center of a heater wire carrying the current to be measured and two auxiliary thermo-couples are attached to the ends of the heater wire. The auxiliary thermo-couples are connected in parallel with each other and in opposition to the main thermo-couple to render the voltage output dependent only on the relative temperatures of the junctions attached to the heater wire whereby a stable condition is reached more rapidly than in prior devices.

---

The present invention relates to thermo-couple devices for current measurement.

In some known devices of this kind the current to be measured is passed through a heating wire to which a thermo-couple is attached. The wire extends between two current-carrying supporting leads and is mounted in an evacuated enclosure and the thermo-couple hot junction is attached to the centre of the wire. The temperature of the cold junction of the thermo-couple is dependent on that of the walls of the enclosure. Because of this the device takes a long time to reach a stable condition which will give reproducible measurements, even if ambient conditions are reasonably constant and are not disturbed by draughts.

In accordance with the present invention there is provided a thermo-couple device for current measurement comprising a heater element extending between supporting conductors, a main thermo-couple junction attached to the centre of the element and two auxiliary thermo-couple junctions attached to the ends of the element, the auxiliary junctions being connected in parallel with one another and in series opposition to the main junction.

It can be shown that with this arrangement the auxiliary junctions in parallel generate a voltage which is proportional to the mean temperature of the ends of the element and the output of the device therefore depends solely on the difference between the temperature of the main thermo-couple junction at the centre of the heater element and the mean temperature of the ends. These temperatures are determined by the heating effect due to the current in the element and the rate of heat loss by radiaiton and by conduction down the supports. A stable condition is thus attained more rapidly and is less liable to variation by external conditions. Changes in the temperatures of the ends of the element resulting from the Peltier effect at the junction between the heater element and the supports do not affect the mean temperature of the ends since they are equal and in opposite directions.

The new arrangement has the further advantage that the assembly of the three thermo-couples can have the same material at each terminal so that the connections from these terminals to the measuring instrument can be symmetrical in order to eliminate unwanted thermo-electric effects.

In the prior arrangement the two component wires of the thermo-couple had to be connected by wires of other materials to the measuring instrument and could give rise to un-compensated thermo-electric effects. The new arrangement is preferably constructed with one component of the main thermo-couple connected to one terminal and the other component composed of the same material as and connected directly to the first component of each of the auxiliary thermo-couples, the second components of the auxiliary thermo-couples being of the same material as the said one component of the main thermo-couple and being connected in common to the other terminal.

The component wires of the three thermo-couples preferably pass through a common bead of electrically-insulating but thermally-conducting material and are symmetrically dimensioned and arranged to minimize any symmetrical thermal effects.

The invention will now be more fully described with the aid of an example illustrated in the accompanying drawing, which is a schematic diagram of the essential elements of a current-measuring device in accordance with the invention.

Following conventional practice, the device is enclosed in an evacuated glass bulb of which only the pinch 10 is shown. Two electrically-conducting leads 11 and 12 of, for example, "Dumet" are sealed through the pinch 10 and support between their ends a heater wire 13 composed of Nichrome 80/20. A main thermo-couple junction between a wire 14 of Chromel P and a wire 15 of Eureka is attached to the centre of the heater wire 13 in conventional manner, for example, by means of a glass bead 15a, which provides a support for the junction which is electrically insulated from the heater wire. The wire 15 is connected to two wires 16 and 17, also of Chromel P, which are joined to wires 18 and 19, respectively, of Eureka to form auxiliary thermo-couple junctions which are attached to the ends of the heater wire 13 by glass beads 16a and 17a in the same manner as the main junction is attached to the centre of the wire. The wires 18 and 19 are connected together and attached to a lead 20, forming one terminal of the thermo-couple system, while the wire 14 is attached to a lead 21, forming the other terminal. The junction of the wires 15, 16 and 17 and the junction of the wires 18 and 19 are embedded in a glass bead 22 which maintains these junctions at the same temperature.

When a current to be measured is passed through the heater wire 13 by means of the supporting leads 11 and 12, a temperature difference is quickly established between the centre of the wire and its ends. Because of the absorption of heat at one end and its emission at the other by reason of the Peltier effect the two ends are not at the same temperature. The two thermo-couple junctions attached to the ends are electrically in parallel and generate a voltage proportional to the mean of the end temperatures. The main thermo-couple junction attached to the centre of the wire is at a higher temperature and this generates a larger voltage, which is in opposition to that due to the auxiliary thermo-couples. Since the wires 16 and 17 18 and 19 of the auxiliary thermo-couples are symmetrical in composition, dimensions and arrangement, both electrically and thermally, and the wires 14, and 18 and 19 are of the same material and connected to similar leads 20 and 21, no other thermo-electric voltages are generated. The output of the thermo-couple system is thus proportional to the difference between the temperature of the centre of the heater wire and the mean temperature of its ends.

While in the embodiment described the auxiliary thermo-cuple junctions are attached to the ends of the heater wire, it will be apparent that they could be moved close and to the centre of the wire, as long as a sufficient temperature difference exists between the main and auxiliary thermo-couples, or could be attached to the supporting leads, providing they are not so close to the pinch as to be influenced by changes in temperature of the envelope. In all cases the auxiliary thermo-couples should be symmetrically positioned with respect to the main thermo-couples.

I claim:

1. A thermo-couple device for current measurement including a current path structure comprising a pair of supporting conductors and a heater element extending between the said conductors, a main thermo-couple junction attached to the centre of the element but electrically insulated therefrom and two auxiliary thermo-couple junctions attached to said element but electrically insulated therefrom at positions symmetrical with respect to the main thermo-couple junction, said positions being positions of stable temperature for a given current and the auxiliary junctions being connected in parallel with one another and in series opposition to the main junction, said device having two leads of the same material connected to said thermo-couple junctions.

2. A thermo-couple device as claimed in claim 1 having two terminals, in which the main thermo-couple has a first component connected to one of the said terminals and a second component, and each of the auxiliary thermo-couples has a first component composed of the same material as and connected directly to the second component of the main thermo-couple, and a second component of the same material as the first component of the main thermo-couple connected to the other terminal of the device.

3. The thermo-couple device as claimed in claim 2 including a bead of electrically-insulating but thermally-conducting material, said components all passing through said bead.

4. A thermo-couple as claimed in claim 3 in which the said components are symmetrically dimensioned and arranged.

5. A vaccum thermo-couple device comprising an evacuated envelope, a pair of supporting conductors extending through said envelope, a heater element electrically connected to and extending between said supporting conductors, a pair of similar leads passing through the envelope, a main thermo-couple comprising first and second component wires having one end of each joined to the other to form a junction, said junction being attached in thermally-conducting but electrically insulated relation to the mid-point of said heater element, and said first component wire being connected to one of said leads, two auxiliary thermo-couples each comprising first and second component wires joined at one end to form a junction, said junctions being attached in thermally-conducting but electrically insulating relation to opposite ends of said heater element, said first component wires being connected directly to the second component wire of the main thermo-couple, and said second component wires being connected together and to the other of said leads, and a bead of electrically-insulating but thermally-conducting material, said component wires of all said thermo-couples being symmetrically arranged and passing through said bead and the connections between said component wires being embedded in said bead.

References Cited

UNITED STATES PATENTS 3,052,846  9/1962  Hill _____ 136—207 X

OTHER REFERENCES 235,746  6/1925  Great Britain.
343,522  2/1931  Great Britain.

ALLEN B. CURTIS, Primary Examiner.